(12) United States Patent
Hellwig et al.

(10) Patent No.: US 10,248,595 B2
(45) Date of Patent: Apr. 2, 2019

(54) VIRTUAL MACHINE MONITOR INTERRUPT SUPPORT FOR COMPUTER PROCESSING UNIT (CPU)

(71) Applicant: Infineon Technologies AG, Neubiberg (DE)

(72) Inventors: Frank Hellwig, Wunstorf (DE); Gerhard Wirrer, Hausham (AT); Glenn Farrall, Long Ashton (GB); Neil Hastie, Lydney (GB)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/673,943

(22) Filed: Aug. 10, 2017

(65) Prior Publication Data

US 2019/0050356 A1 Feb. 14, 2019

(51) Int. Cl.
*G06F 9/48* (2006.01)
*G06F 13/34* (2006.01)
*G06F 9/455* (2018.01)

(52) U.S. Cl.
CPC .......... *G06F 13/34* (2013.01); *G06F 9/45558* (2013.01); *G06F 9/4818* (2013.01); *G06F 2009/45591* (2013.01)

(58) Field of Classification Search
CPC ............. G06F 9/45533; G06F 9/45558; G06F 2009/4557; G06F 2009/45579; G06F 9/48; G06F 9/4812; G06F 9/4818; G06F 9/4831; G06F 9/5005; G06F 9/5027; G06F 9/5038; G06F 9/5077; G06F 13/24; G06F 13/26; G06F 13/32; G06F 13/34
See application file for complete search history.

(56) References Cited

U.S. PATENT DOCUMENTS

| 5,072,376 | A | * | 12/1991 | Ellsworth | ........... | G06F 11/3423 |
| | | | | | | 713/502 |
| 5,553,291 | A | * | 9/1996 | Tanaka | ................ | G06F 9/45533 |
| | | | | | | 718/1 |
| 6,128,641 | A | * | 10/2000 | Fleck | .................. | G06F 9/30043 |
| | | | | | | 718/108 |
| 6,378,065 | B1 | * | 4/2002 | Arnold | ................ | G06F 9/30116 |
| | | | | | | 711/157 |

(Continued)

*Primary Examiner* — Thomas J Cleary
(74) *Attorney, Agent, or Firm* — Eschweiler & Potashnik, LLC

(57) ABSTRACT

An interrupt interface of a central processing unit (CPU) comprises a bus with a plurality of interfaces to various components of the CPU. These components can include a memory that includes instructions to execute operations of a processor component, a plurality of virtual machines (VMs) and a virtual machine monitor (VMM)/hypervisor configured to execute the plurality of VMs. The processor can receive interrupt requests (interrupt) as service requests in parallel, which can be executed by the VMM or any one or more of the plurality of VMs to execute VM applications on a dedicated instance of a guest operating system for a task. The processor can further determine whether to grant an interrupt request to the VMM and the VMs based on predetermined criteria, including a current task priority, a pending interrupt priority, or an interrupt enable, associated with the current status of each of the component.

19 Claims, 7 Drawing Sheets

(56) References Cited

U.S. PATENT DOCUMENTS

| | | | | |
|---|---|---|---|---|
| 7,707,341 B1* | 4/2010 | Klaiber | ............... | G06F 9/45533 710/244 |
| 8,612,659 B1* | 12/2013 | Serebrin | ................ | G06F 13/24 710/262 |
| 2004/0117532 A1* | 6/2004 | Bennett | ............... | G06F 9/45533 710/260 |
| 2006/0161917 A1* | 7/2006 | Leung | ................ | G06F 9/45533 718/100 |
| 2007/0157197 A1* | 7/2007 | Neiger | ................ | G06F 9/45533 718/1 |
| 2008/0141277 A1* | 6/2008 | Traut | ................ | G06F 9/45533 719/313 |
| 2010/0191887 A1* | 7/2010 | Serebrin | ............... | G06F 9/4812 710/267 |
| 2012/0151111 A1* | 6/2012 | Jung | ....................... | G06F 13/26 710/263 |
| 2013/0042242 A1* | 2/2013 | Kagan | ................ | G06F 9/45558 718/1 |
| 2014/0047150 A1* | 2/2014 | Marietta | ................ | G06F 13/14 710/264 |
| 2015/0121377 A1* | 4/2015 | Zang | .................. | G06F 9/45558 718/1 |
| 2015/0150118 A1* | 5/2015 | Addepalli | ............. | G06F 12/145 726/17 |
| 2016/0328261 A1* | 11/2016 | Mine | ..................... | G06F 9/4818 |
| 2017/0185435 A1* | 6/2017 | Dewan | ............... | G06F 9/45558 |

\* cited by examiner

Figure 5: CPU with extended PSW, dedicted ICR / PCXR and additional ICR_CTRL

VIRTUAL MACHINE MONITOR INTERRUPT SUPPORT FOR COMPUTER PROCESSING UNIT (CPU)

FIELD

The present disclosure is in the field of security, and more specifically, pertains to virtual machines and techniques for supporting interrupts of a computer processing unit (CPU).

BACKGROUND

A CPU with a hypervisor or a virtual machine monitor (VMM) support is able to execute multiple virtual machines (VMs). Each VM can execute its own application on a dedicated instance of an operating system. Each VM application can be interrupt driven, meaning that hardware resources assigned the VM application (e.g., interfaces, Direct Memory Access (DMA) channels, or other resources) can send interrupts to the application to request for attention/resource allocation. It is also possible that other CPUs can send software SW interrupts to a VM application, which can be a part of a virtualization resource (VR) performing the same function(s) as physical resource or node.

A hypervisor or VMM can be a computer software, firmware or hardware that creates/runs/executes virtual machines. A computer or processing device on which a hypervisor runs one or more virtual machines can be referred to as a host machine, and each VM a guest machine. The hypervisor provides the guest operating systems with a virtual operating platform and manages the execution of the guest operating systems. Multiple instances of a variety of operating systems may share the virtualized hardware resources: for example, Linux, Windows, and macOS instances can all run on a single physical x86 machine. This contrasts with operating-system-level virtualization, where all instances (e.g., containers) share a single kernel, though the guest operating systems can differ in user space, such as different Linux distributions with the same kernel.

DETAILED DESCRIPTION

Figure 1:
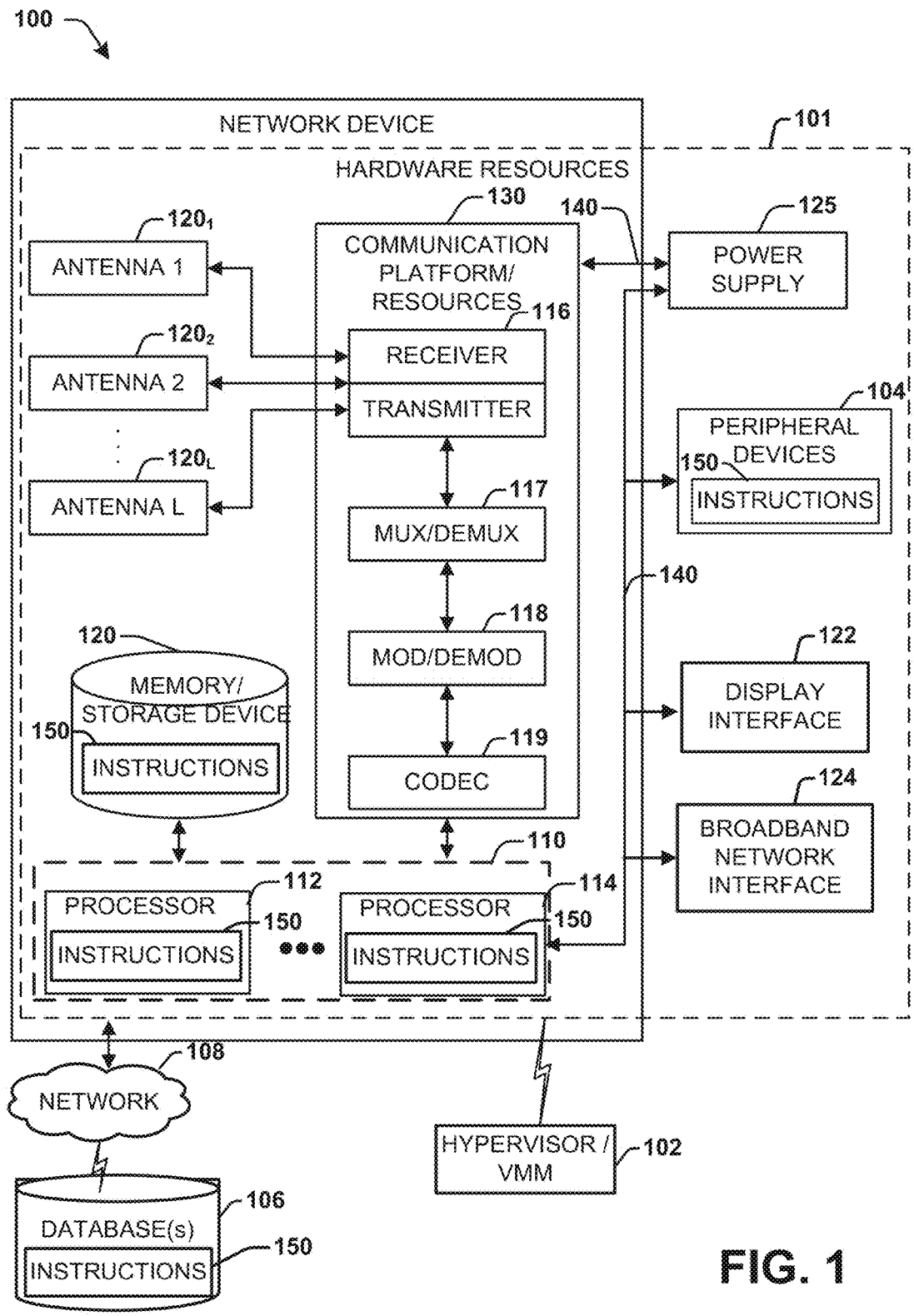
FIG. 1 is a block diagram illustrating components of a network device in accordance with one or more aspects or embodiments described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal). A component can also be referred to as a machine.

As another example, a component can be an apparatus with specific functionality provided by mechanical/machine parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

INTRODUCTION

Hypervisors and virtual machines can operate to improve the efficiency of utilization of larger computing infrastructures, whether in the form of an original IBM 360, or presently in the form of an x86, CPU, server rack/bank, or other similar processing device, which, for example, can be a part of an application or software to generally improve the utilization efficiency of a hardware. A hypervisor or virtual machine monitor (VMM) can be referred to interchangeably herein, either of which can be considered a computer software, firmware or hardware that creates and runs virtual machines (VMs). A computer, process or processing device on which a hypervisor executes one or more VMs can be referred to as a host machine, and each VM can be referred to as a guest machine. Employing fabricated technologies such as these (e.g., silicon technologies) into hard real-time systems with adaptable interrupts and interrupt response times, which are now much more significant than ever, further provides an opportunity for improved efficiencies in interrupt interfaces with VMMs, and, in particular, within the interrupt communication link or interface within a CPU package or a processing device.

For example, in the case of traditional server art environments, where operations can aim for a more complete and perfect virtualization, if the processing operations track or emulate one or more processes in the hypervisor before turning-back to a guest operating system for resource support, it is not as detrimental to disturb/modify the guest operating system. With particular regard to hardware, real-time, safety considerations (e.g., automotive safety, or the like) a certain amount of para-virtualization (i.e., changing of the public/guest operating system to preserve safety characteristics and preserve real-time characteristics) can be enabled. Para-virtualization can be an enhancement of the virtualization technology in which the guest operating system can be recompiled inside a VM, and dynamically enable an interrupt interface system to the VM to differ from the underlying hardware, for example.

In the hardware, with particular aspects/embodiments herein, an interrupt can be steered/directed into the guest operating system based on dynamic and real-time resource conditions. Rather than pre-configuring all interrupts of an application or task to be directed to the hypervisor or VMM for processing, a decision logic or set of decision processes can be configured that enables the VMM and associated software to decide what to do with the interrupt(s) and to what resources to direct these towards.

In particular aspects/embodiments, a CPU can be configured to be aware of the status of all interrupt components, including the VMM and one or more VMs in parallel or all together at once at any one time. These VMs and the hypervisor/VMM can be controlled, managed or enabled by the processing components of the CPU located on the same processor package, packaging core or same device. The CPU can operate in a VMM mode or a VMx mode, in which x can be any positive integer and a function of the number of guest machines or VMs hosted by the CPU. If the CPU, for example, operates in the VMM mode or in a VMx mode, the CPU knows in parallel (or at once) via an interrupt bus for each VM/guest machine and the VMM of any pending interrupt(s) with highest priority for each VM and VMM.

Depending on the mode of operation, the CPU or processor component of the CPU can make the decision to directly pass a new interrupt to any given or targeted VM, as in VM mode, or switch to VMM mode and delegate the decision making or interrupt processes to the VMM for the VM, for example. This new interrupt can be from one VM of the CPU to another VM of the CPU, for example, other internally controlled component of the CPU, as well as from an external component of a device application, for example. Additional aspects, embodiments or details of the disclosure are further described below with detail in reference to figures.

FIG. 1 is a block diagram illustrating components of a system or network device 100, according to some example embodiments, able to read instructions from a machine-readable or computer-readable medium (e.g., a machine-readable storage medium) and perform any one or more of the functions, operations, processes or methodologies discussed herein. One or more components of the system or device 100 can be employed or utilized with, in or as a part of a network device or system such as a mobile device, wireless device, a network device/component (e.g., a network access node, network orchestrator, network server, rack server, network controller/processor, network data base, CPU, or the like). Specifically, FIG. 1 illustrates a diagrammatic representation of hardware resources 101 that can be configured for use within the network device or a system 100 including one or more processors (or processor cores) 110, one or more memory/storage devices 120, and one or more communication resources 130, each of which can be communicatively coupled via a communication link (e.g., a bus 140) or other connection (e.g., an optical link, wireless connection, wired connection, or other like communication connection).

For embodiments where node virtualization can be utilized, as in a network function virtualization (NFV) operation, a hypervisor 102 (or VMM) can be executed to provide an execution environment for one or more network slices/sub-slices to utilize the hardware resources 101. Such hypervisor 102, for example, can comprise a virtual machine monitor (VMM) that comprises a computer software, firmware or hardware resources, which create or execute on virtual machines to operate on a computer/processing device. Virtualization, as referred to herein, can be referred to as the removal of a function from a device and assigning or relocating the function to another device on a network either as software, firmware, specialized hardware or a combination for performing the similar or same function as another component at a different location in the device, system or network, for example.

The processors 110 (e.g., a CPU, a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) can include, for example, any number of processing components such as a processor 112 and a processor 114. The memory/storage devices 110 can include main memory, disk storage, or any combination thereof.

The communication resources 130 can include interconnection and/or network interface components or other suitable devices to communicate with one or more peripheral devices 104 or one or more databases 106 via a network 108. For example, the communication resources 130 can include wired communication components (e.g., for coupling via a Universal Serial Bus (USB)), cellular communication components, Near Field Communication (NFC) components, Bluetooth® components (e.g., Bluetooth® Low Energy), Wi-Fi® (Wi-Fi/WiFi) components, and other communication components.

Instructions 150 can comprise software, a program, an application, an applet, an app, or other executable code for causing at least any of the processors 110 to perform any one or more of the methodologies discussed herein. The instructions 150 can reside, completely or partially, within at least one of the processors 110 (e.g., within the processor's cache memory), the memory/storage devices 110, or any suitable combination thereof. Furthermore, any portion of the instructions 150 can be transferred to the hardware resources 101 from any combination of the peripheral devices 104 and/or the databases 106. Accordingly, the memory of processors 110, the memory/storage devices 110, the peripheral devices 104, and the databases 106 are examples of computer-readable and machine-readable media.

In an aspect, network device 100 can receive and transmit signal(s) to and/or from wireless devices such as APs, access terminals, wireless ports and routers, or the like, through a set of L antennas $120_{1-L}$, which can be configured according to one or more embodiments or aspects described herein. In one example, antennas 120 can be implemented as part of a communication platform 130, which in turn can comprise electronic components and associated circuitry and/or other means that provide for processing and manipulation of received signal(s) and signal(s) to be transmitted. The antennas 120 can comprise the various antenna elements incorporating the different aspects or embodiments disclosed herein.

In an aspect, communication platform/resources 130 can include electronic components with associated circuitry that provide for processing and manipulation of received signal(s) and other signal(s) to be transmitted. The communication platform 130 can further comprise a receiver/transmitter or transceiver 116, which can transmit and receive signals and/or perform one or more processing operations on such signals (e.g., conversion from analog to digital upon reception, conversion from digital to analog upon transmission, etc.). In addition, transceiver 116 can divide a single data stream into multiple, parallel data streams, or perform the reciprocal operation.

Additionally, the communication device 100 can include display interface 122, which can display functions that control functionality of the device 100, or reveal operation conditions thereof. In addition, display interface 122 can include a screen to convey information to an end user. In an aspect, display interface 122 can be a liquid crystal display, a plasma panel, a monolithic thin-film based electro chromic display, and so on. Moreover, display interface 122 can include a component (e.g., speaker) that facilitates communication of aural indicia, which can also be employed in connection with messages that convey operational instructions to an end user. Display interface 122 can also facilitate data entry (e.g., through a linked keypad or through touch gestures), which can cause access equipment and/or software 100 to receive external commands (e.g., restart operation).

Broadband network interface 124 facilitates connection of network device 100 to network 108 that can include one or more network/cellular technologies through backhaul link(s) (not shown), which enable incoming and outgoing data flow. Broadband network interface 124 can be internal or external to network device 100, and can utilize display interface 122 for end-user interaction and status information delivery.

One or more processor(s) 110 can include one or more processors 112, 114 that can be functionally connected to communication platform/resources 130 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, one or more processors 110 can be functionally connected, through data, system, or an address bus 140, to display interface 122 and broadband network interface 124, to confer, at least in part, functionality to each of such components.

In another example, a multiplexer/demultiplexer (mux/demux) unit 117 can be coupled to transceiver 116. Mux/demux unit 117 can, for example, facilitate manipulation of signal in time and frequency space. Additionally or alternatively, mux/demux unit 117 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 117 can scramble and spread information according to substantially any code generally known in the art, such as Hadamard-Walsh codes, Baker codes, Kasami codes, polyphase codes, and so on.

In a further example, a modulator/demodulator (mod/demod) unit 118 implemented within communication platform 130 can modulate information according to multiple modulation techniques, such as frequency modulation, amplitude modulation (e.g., L-ary quadrature amplitude modulation (L-QAM), etc.), phase-shift keying (PSK), and the like. Further, communication platform 130 can also include a coder/decoder (codec) module 119 that facilitates decoding received signal(s) and/or coding signal(s) to convey.

According to another aspect, wireless terminal/network device or system 100 can include a processor 110 (e.g., 112, 114) configured to confer functionality, at least in part, to substantially any electronic component utilized by the network device/system 100. As further shown in system 100, a power supply 125 can attach to a power grid and include one or more transformers to achieve a power level at which various components and/or circuitry associated with wireless terminal 100 can operate. In one example, power supply 125 can include a rechargeable power mechanism to facilitate continued operation of wireless terminal 100 in the event that wireless terminal 100 is disconnected from the power grid, the power grid is not operating, etc.

In a further aspect, processor(s) 110 can be functionally connected to communication platform 130 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor(s) 110 can be functionally connected, via a data or system bus 140 (e.g., a wireless PCIE or the like), to any other components or circuitry not shown in system 100 to at least partially confer functionality to each of such components, such as by the antenna systems disclosed herein.

As additionally illustrated, a memory 120 or data base 106 can be used by wireless terminal/device/system 100 to store data structures, code instructions 150 and program modules, system or device information, code sequences for scrambling, spreading and pilot transmission, location intelligence storage, determined delay offset(s), over-the-air propagation models, and so on. One or more processor(s) 110 can be coupled to the memory 120 or data base 106 in order to store and retrieve information necessary to operate and/or confer functionality to communication platform 130 and/or any other components of wireless terminal 100.

Further, the antenna systems described above with the device 100 can also be configured, for example, to operate at a wide range of frequencies in a high band frequency range additionally include peer-to-peer (e.g., mobile-to-mobile) ad hoc network systems often using unpaired unlicensed spectrums, 102.xx wireless LAN, BLUETOOTH and any other short- or long-range, wireless frequency ranges and communication techniques. The narrow band antenna elements disclosed herein, such as antennas resonating systems of devices disclosed, for example, can also be configured to operate at other frequency ranges also.

In other examples, the components disclosed herein can operate to communicate wirelessly with other components, such as the display interface 122 as a wireless device, or with other wireless interfaces, such as a wireless USB device, for example. For example, a wireless USB device can communicate within a frequency range. In addition, the antenna systems disclosed can be configured to communicate with other wireless connections, components, interfaces or devices in order to provide communication interfacing for wireless component-to-component communications. For example, a PCB to PCB interface can be facilitated by the high band antenna systems as well as micro millimeter wave communications among one or more internal or external components. Other communication interfaces can also be facilitated by the antenna elements disclosed such as an internet of things (IoT) to IoT components, wearable componpents, mobile to mobile, a network base station (e.g., a macro cell network device, femto cell device, pico cell device or other network devices) or any combination thereof to communicate via one of more of the antenna elements, such as via the antenna system or devices herein, for example. Additional other examples are also envisioned by which the antenna systems disclosed herein can operate in different frequency ranges, as well as communication and facilitate communications with, or among, one or more wireless components or devices. For example, industrial, scientific and medical (ISM) radio bands, radar band widths, or other ranges of a frequency spectrum can also be facilitated for communications by the antenna systems being disclosed.

The components of the network device/system 100 or associated interrupt interface can be implemented in one physical node or separate physical nodes including components or functions to read and execute instructions from a machine-readable or computer-readable medium (e.g., a non-transitory machine-readable storage medium). In some embodiments, Network Functions Virtualization (NFV) is utilized to virtualize any one or more described processing or interrupt functions via executable instructions stored in one or more computer readable storage mediums (described in further detail below).

NFV architectures and infrastructures can be used to virtualize one or more network functions, alternatively performed by proprietary hardware, onto physical resources/components comprising a combination of industry-standard server hardware, storage hardware, or switches, for example. In other words, NFV components/devices/systems can be used to execute virtual or reconfigurable implementations of one or more interrupt components/functions.

Figure 2:
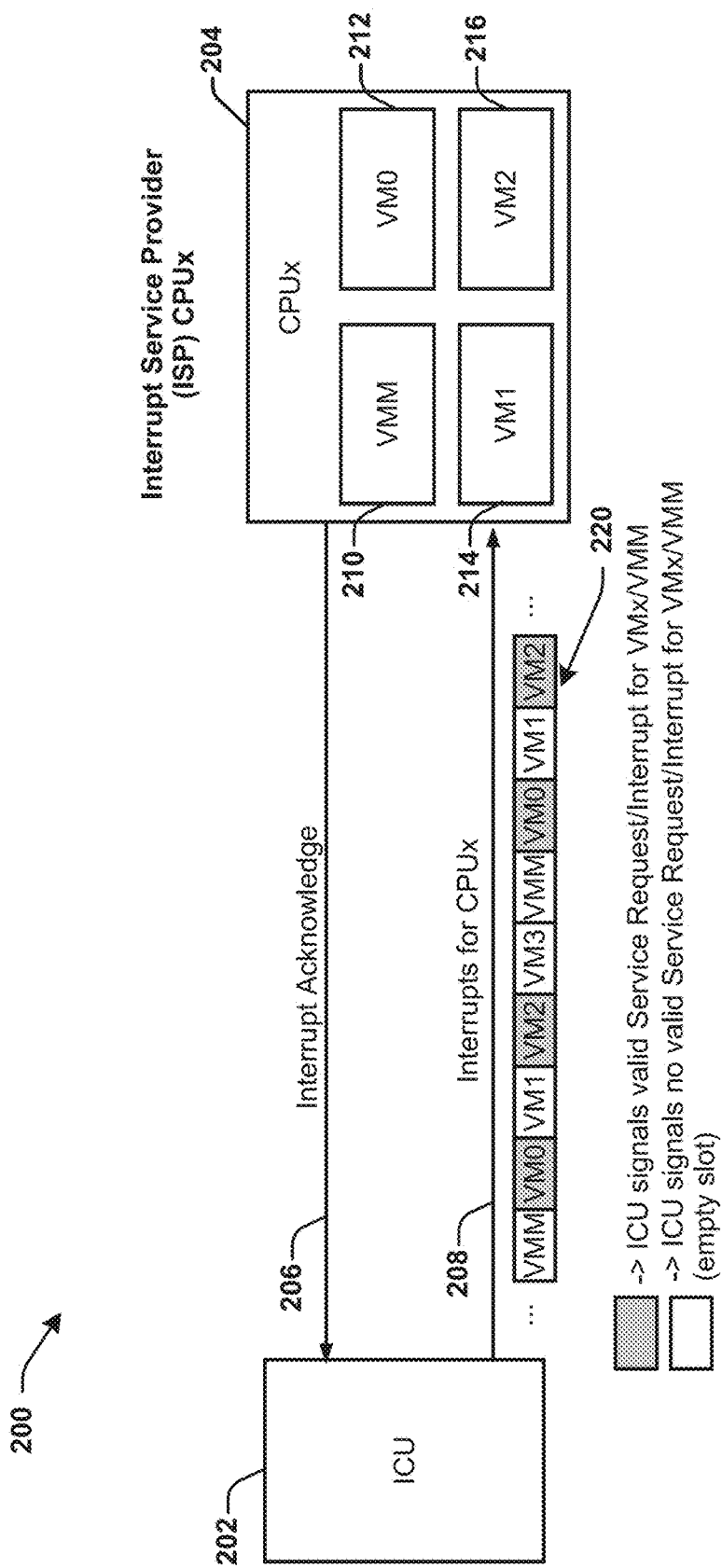
FIG. 2 is a block diagram illustrating an interrupt control unit (ICU) to a computer processing unit (CPU) interface with s hypervisor/virtual machine monitor (VMM) according to various aspects or embodiments described herein.

Referring to FIG. 2 is an example interrupt interface system 200 that can be included/a part of/communicatively coupled to the processor(s) 110 and components of FIG. 1. The system 200 includes an interrupt controller or interrupt control unit (ICU) 202/processor component communicatively coupled to a CPU 204/other processor component that arbitrates among pending interrupts mapped to a single CPU 204, which can also be the processor 110 or any one processor 112, 114 unit therein, for example.

A single hardware CPU 202 can map interrupts with a priority that can up to about 255 as a highest/lowest priority from zero on the opposite end of the scale, which can further be encompassed or communicated via a priority vector 220 (e.g., an 8-bit priority vector) with the priority of interrupts to the CPU 204 via one or more interrupt interface bus 208. In response to receiving the vector 220, the CPU 204 can respond by an interrupt acknowledgement (ACK) on bus 206, which can be a half or full duplex bus, for example, or other communication link such as an optical link or the like.

As an interrupt or service request is received by the CPU 204 from the ICU 202 or other component it has to be serviced by the CPU 204 as a task, which can be a basic unit of programming or execution as firmware/hardware operating as a system control, which can be at least a part of a program or successive invocation of the program as a process to be executed for an application on a dedicated instance, for example. In addition, each task executed on the CPU 204 can also include a priority.

Further, the ICU 202 can obtain the interrupts from on-chip resources, or external resources. An interrupt can be a service request for attention to utilized resources by the CPU 204. The ICU 202, for example, can change an interrupt to an interrupt request by adding information; as used herein, an interrupt and a service request can be used interchangeably, in which an interrupt is being received as a service request to trigger an interrupt service routine, for example, or other interrupt process when a resource such as a VM, VMM, processing array or component is busy or in execution of another task.

The ICU 202 can send a single signal 220 to provide CPUx 204, which conveys information about an application or other component wants the CPU 204 to process by starting an interrupt service routine (ISR). The single signal information in the ICU 202 is thus enhanced with this additional information.

For example, the ICU 202 can add priority information to an interrupt to provide an interrupt with an interrupt priority and arbitrate among all other pending interrupts for the CPU, and further send other information such as the interrupt size to the CPU 204. As such, the ICU 202 can operate as processing/processor device integrated with/as part of the CPU 204 with a hypervisor or VMM support. This means the CPU 202 is not necessarily executing a single task of an operating system with an application software residing or operating on it. The operating system can be a single application software that also gets a priority from 0 to 255 of the priority interrupt.

The CPU 204 can include a VMM 210 and a plurality of VMs, comprising VM0 212, VM1 214, VM2 216, for example. The shaded portions of the vector 220 can provide for an ICU 202 signaling for a valid service request/interrupt designated for a VMx (e.g., VM0 212, VM1 214, or VM2 216)/the VMM 210. The unshaded portions of the vector 220 can indicated no valid service request/interrupt for a VMx/VMM as an empty slot. These interrupts from the ICU 202 in the CPU 204, for example, as a single signal or vector can be for different machines, where the interrupt for the different virtual machines can be time multiplexed from the ICU 202 to the CPU 204 as part of one aspect herein, for example.

Each VM can include an operating system plus application software and interrupts with the priority from 0 to about 255, or a different priority range, for example, as well as a different priority scheme or protocol from one another for determining or identifying a winning interrupt on a basis of priority. In some operations, interrupts are sent to the CPU 204 and whenever a new interrupt comes in with a priority of 0 to 255 (or other range of priorities), for example, then the VMM 210 is called/signaled/trigger and the VMM understands/derives the that the priority number is mapped to a particular VM such as VM0 212, or other particular VM, for example, and calls upon that VMx (e.g., VM0 212) for execution of the associated task with the interrupt based on a priority scheme with other interrupts queued for a current execution of a task. Then, an arbitration of all the interrupts ca be mapped to one virtual machine, in which the winner of all interrupts can be sent for VM0 212, and likewise for VM1 214, VM 2 216, and so on from among all pending interrupts and winning requests/interrupts of each VM.

Figure 3:
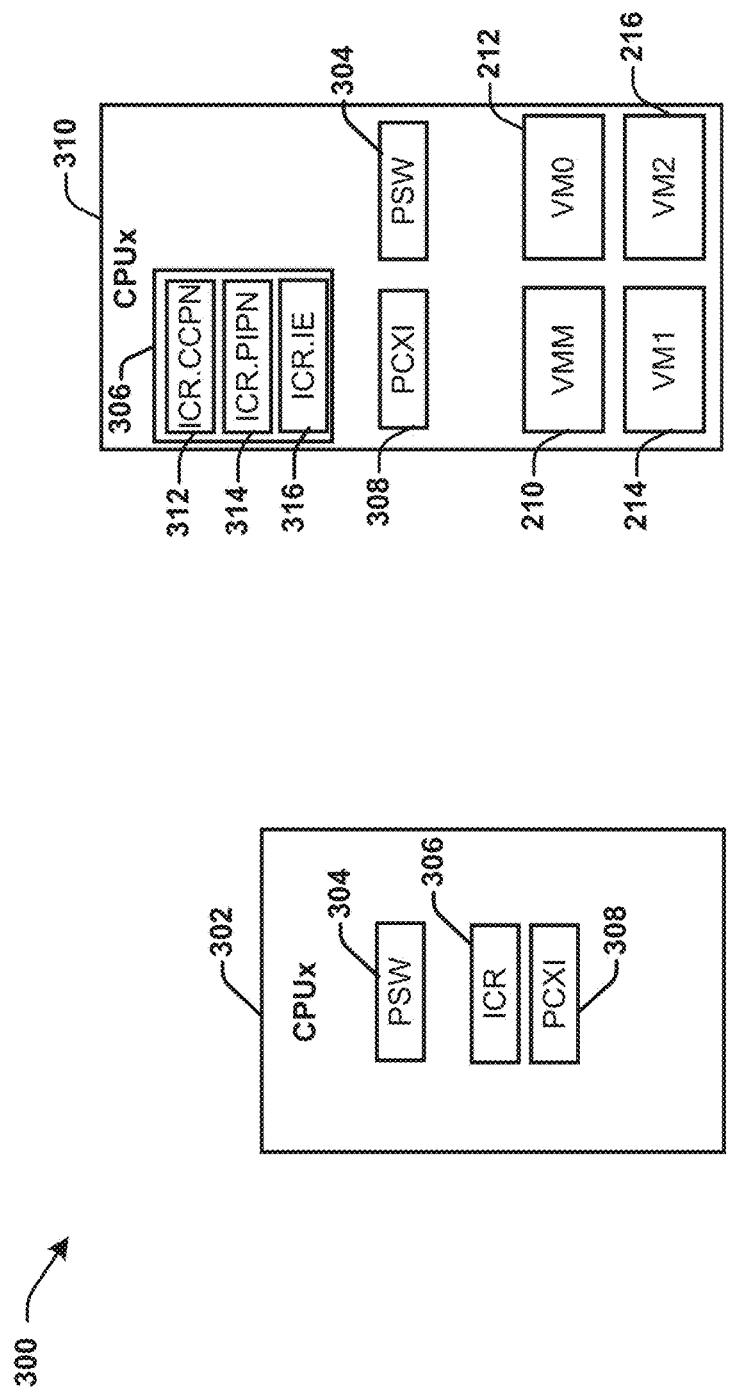
FIG. 3 is another block diagram of a CPU according to various aspects or embodiments described herein.

Referring to FIG. 3, illustrated are example CPUs with an interrupt interface in accordance with one or more aspects/embodiments herein. CPU 310 illustrates the CPUs with the VMM 210, the plurality of VMs 212-216 communicatively coupled via an interface bus (not shown) with as CPU processor status word (PSW) 304, the ICR 306, and the previous context information register (PCXI) 308 as corresponding registers.

The CPU 302 and CPU 310 comprises a CPU Internet control register (CPU ICR) 306 that includes information sent from the ICU 202, for example, to the CPU 302, 310, or by an internal CPU component such as a VMM, VM or other component. CPU 302 and CPU 310 can also be/part of/coupled with the processor 110 or any one processor 112, 114 unit therein, for example. The information sent or received can include: a current task priority that is a priority of the CPU software of execution, the latest interrupt priority sent by the ICU 202 to the CPU 302, 304, and an additional control bit that indicates whether the CPU is now enabled to be interrupted by a new interrupt with a priority above the task/sub-task priority or that satisfies a defined threshold.

The PSW 304 can be a word/byte that describes the condition of a component or the CPU at each instant, and indicate which class of operations are forbidden, or allowed, as well as the status of interrupts associated with the CPU or processor. The PSW 304 can also indicate the address of the instruction currently being executed. As such, the CPU 310 enables real time system support for mechanisms that enable the application software to control the conditions under which a new interrupt received via the interrupt system is enabled to interrupt the task under execution.

In particular, the CPU 310 can provide the ICR 306 with a current CPU priority number (ICR.CCPN) 312, a pending interrupt priority number (ICR.PIPN) 314 and an interrupt enable Bit (ICR.IE) 316, for example. The ICR.CCPN 312 can comprise a bit field that can be set by the operating system and shows the priority number of the current software task, in which a higher value can have a higher priority, for example. CCPN as referred to herein can be also referred to similarly as a current machine priority number (CMPN), or vice versa, and used interchangeably depending on the context.

The ICR.PIPN 314 can comprise a bit that can be set by the interrupt system hardware such as a processor component (e.g., PC 408) of the ICU 202 or CPU 204, 302, 310. It indicates the pending interrupt (service request) to be serviced by this CPU 310. For example, PIPN=0 is defined as 'no interrupt pending', with a higher value having higher priority, for example.

The ICR.IE 316 can be active if it is set as a bit interrupt enable. If this bit 316 is set (or true), the CPU 310 can start with the interrupt service routine (ISR) as defined by the PIPN number, and further if the following threshold is satisfied: the PIPN>CCPN, or where the PIPN 314 is greater than the CCPN 312 number. As such, the CPU 310 could then start the ISR as long the CCPN 312 is >=PIPN 314.

As long the IE 316 is not set, the CPU 310 can ignore the PIPN 314 register value (meaning that it can ignore (disregard/pend action) any new interrupts/service requests). The IE bit 316 can be cleared automatically by hardware in response to a start of an ISR. This mechanism enables an ISR to execute a minimal number of instructions before it can be interrupted again by an interrupt/service request with a higher priority (e.g., higher PIPN). The software/CPU 310 processor component can then set the IE 316 again when it is ready to be interrupted again.

The CPU 310 further includes the PCXI 308 register that controls data related to a previous interrupt or task that was interrupted by a previous interrupt/service request. This information/related data can include a previous CPU priority number (PCXI.PCPN), the PCXI, and a previous CPU interrupt enable (PCXI.PCIE), in which each provide data about the task that was interrupted by a previous interrupt/service request. This PCXI information can be used by the CPU hardware 310 when the related software or application of the previous task wants to execute a 'Return from Interrupt Instruction' (RFI) instruction and continue the previously interrupted task, for example, which can facilitate a return to a previous task by the resource or component that was interrupted. The CPU 310 can decide whether the application/software shall execute the RFI and return to the previous task (with the task priority as saved in the register component 308 as the PCXI.PCPN), or whether it shall directly start with a new pending interrupt/service request (with the Service Request priority available in the ICR.PIPN 314). As such, in response to the situation where the software/application requests to execute an RFI for a previously interrupted task to be executed, the CPU 310 can initiate operations with a new interrupt/service request if the ICR.PIPN 314 is greater than or about the PCXI.PCPN (e.g., ICR.PIPN 314>PCXI.PCPN), or satisfies a related threshold, otherwise the CPU 310 can return to the previous task for execution.

Interrupt interfaces for a CPU with VMM support can provide the CPU with a single interrupt interface and no special hardware support, and often can give the CPU with one interrupt interface for the VMM, and one for the VM. As such, all interrupts could be handled by the VMM 210. This means that all interrupts could be mapped to a CPU in one priority scheme (e.g. 0-255), any interrupt requires a VMM call for execution, the VMM 210 can only see/attend to one interrupt at time, or the VMM overhead is linearly connected to the number of interrupts.

When all interrupts (either currently pending, or incoming, new interrupts from one or more CPU components or other device components) are handled by the VMM 210, this can mean that all VMx (e.g., 212-216) interrupts could be mapped to single priority scheme (e.g. 0-255) instead of corresponding or individual priority schemes for each VMx, a VMM interrupt could be with dedicated priority scheme (e.g. 0-32), any interrupt requires a VMM call (or VMM directed action/signal to initiate), the VMM 210 can only see one VMM and one VMx interrupt at time, or the VMM overhead is linearly connected to the number of interrupts.

Figure 4:
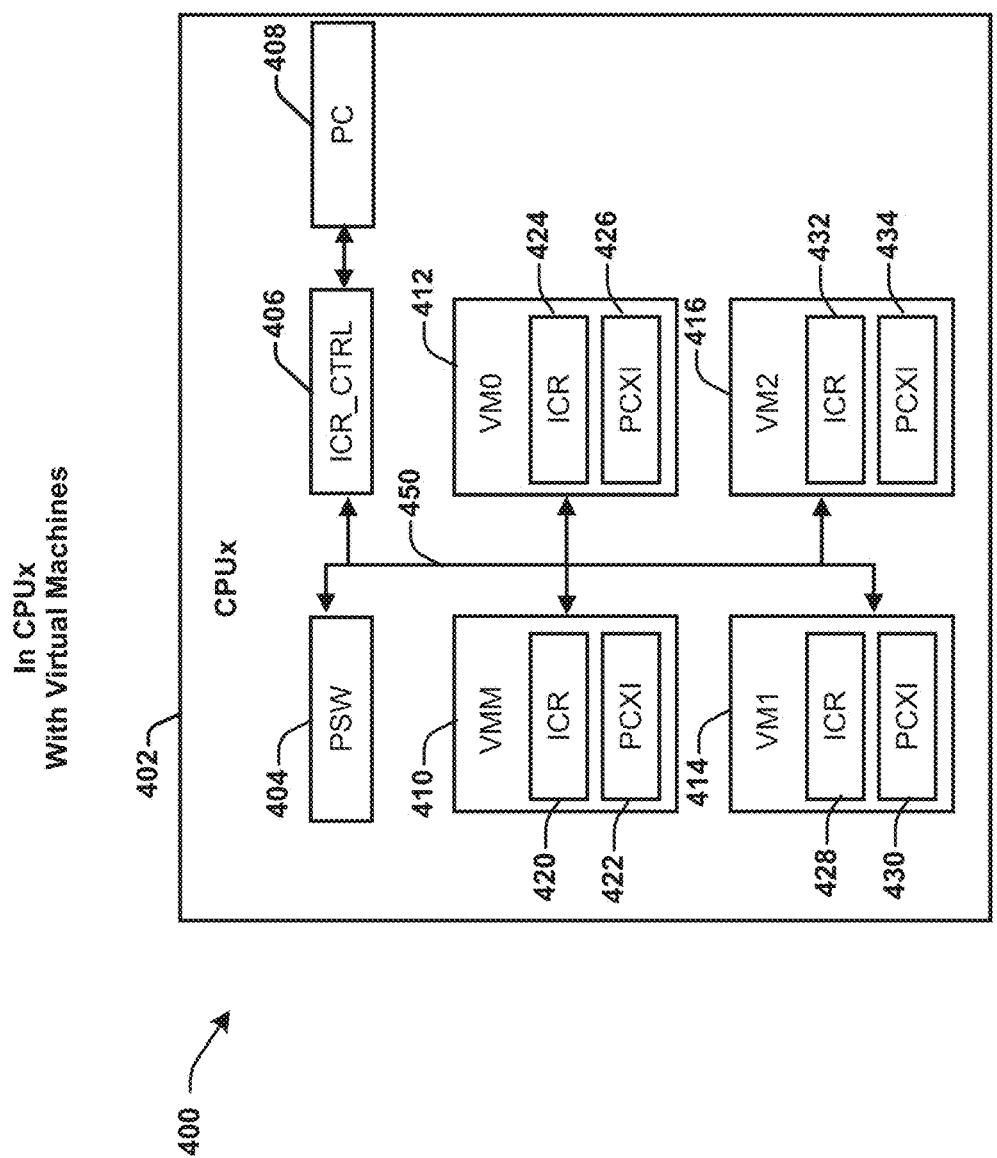
FIG. 4 is another block diagram of a CPU configuration of components for interrupts with hypervisor/VMM support according to various aspects or embodiments described herein.

Referring to FIG. 4, illustrates another example CPU 402 in accordance with other various aspects/embodiments herein. The CPU 402, for example, can be configured with Hypervisor/VMM support that can drastically reduce the performance overhead for the handling of interrupts and decrease the number of clock cycles utilized for interrupt interfaces or interrupt bus systems integrated the components of the CPU 402 or processor. CPU 402, as with CPU 302 and CPU 310, and any other processor or CPU herein can also be/part of/coupled with the processor 110 or any one processor 112, 114 unit therein, for example.

In an aspect, the CPU 402 comprises a PSW 404, the ICR_CTRL 406, the processor device 408, the VMM 410 and a set of VMs 412-416. The VMM 410 and the VMs 412-416 of the CPU 402 each comprise a corresponding ICR 420, 424, 428, and 432, which can each comprise similar components as the ICR 306 of CPU 310 of FIG. 3. Additionally, the VMM 410 and the VMs 412-416 of the CPU 402 each comprise a corresponding PCXI 422, 426, 430, and 434, respectively, which can all be coupled together via a bus 450 at one or more interfaces respectively, in which the CPU 402 can be aware of or process data from each component concurrently or in parallel at once.

The ICR registers 420, 424, 428, and 432 are configured to indicate (e.g., via the bus 150, or the like), a current task priority, a pending interrupt priority, and an interrupt enable status, as discussed above with the ICR 306 of FIG. 3. In addition, the PCXIs 422, 426, 430, and 434 can be configured to indicate, via the bus, information related to a previous/interrupted task, wherein the information includes an enable state of the previous/interrupted task being executed by the corresponding component, VMM, VM or CPU.

In one example, the CPU 402 can become aware of/operate parallel inputs from each machine, a VMM 410 and each VMx 412, 414, 416 with its dedicated interrupt priority scheme (e.g., interrupts to VMM 410 with priorities 0-255, interrupts to VM0 412 with priorities 0-255, interrupts to VM1 414 with priorities 0-255, and interrupts to VM2 416 with priorities 0-255). The CPU 402 hardware becomes aware about the status of the current machine software task (VMM 410 or, if not VMM 410, which VMx 412-416 is currently operating or not in a busy state of execution). The status of VMM 410 and each VMx 412-416 can become transparent to the CPU 402 or associated processing component in parallel/concurrently/at same time/simultaneously to CPU hardware and the VMM software, for example. As such, the interface bus 450 communicatively coupling the components of the CPU 402 illustrated can operate transparently regarding the current task priority(ies), the pending interrupt priority(ies), and the interrupt enable. These aspects can further enable the CPU 402 to support a more flexible execution of the virtual machine service requests or interrupts being provided or incoming for execution by a VM on the CPU 402, for example.

In another aspect, a dedicated priority scheme can be provided or enabled independently per VMx 412-416 and for the VMM 410, the outputs of which can be aggregated, received, processed by the VMM 410 or by the processing device 408 of the CPU 402, depending on the mode of operation of the CPU (VM mode, or VMM mode). Interrupts mapped to a VM currently under execution can be directly forwarded to any VM 412-416, without a VMM call, or, in other words by the processor component 408, as if in VM mode of operation, for example.

A hardware control/decision mechanism or processor component (e.g., PC 408), can be configured by the VMM 410, which defines the conditions under which a VMx (e.g., 412-416) can be interrupted by a service request to a different VM, or, in other words, interrupt/services requests among VMs of the CPU 402.

Further, additional priority thresholds (beside, or in addition to, the PIPN and CCPN) can be defined for being a factor in the decision involving whether or not (or when) a VM (e.g., VM0 412) can be interrupted directly by an interrupt mapped to another VM (VM1 414). That is, the decision to enable interrupts and responding ISRs from among VMs of the same CPU 402 can be decided to be implemented directly, without a VMM call from the VMM 410, based on one or more of: the PIPN, CCPN, or additional priorities/additional priority thresholds being satisfied, as factors/functions of this decision operation by the PC 408.

In other aspects/embodiments, the CPU 402 can be configured to replicate its hardware (e.g., processing components or processing functions) to the ICR 406 for the various VMs 412-416; this gives the interrupt hardware the ability to present an interrupt for a particular VM 412-416, VMM 410 and for the CPU in parallel to be comparing multiple priorities, rather than just only one priority in a single comparison at a time. As such, the CPU 402 via the processing component 408, for example, can have information from each component 404-434 input in parallel with multiple different priorities able to multiplexed or compared to determine interrupt service requests, current conditions, and previous conditions to initiate an ISR to interrupt a component/resource on a dedicated instant of an application of a guest operating system for a task to be carried out. The CPU 402 can therefore operate to receive/process multiple machine interrupts (VM interrupts) in parallel and make hardware decisions in parallel about whether to accept them straight away into a guest operating system, or accept them straightaway into the hypervisor/VMM, or generically ignore them because of the interrupt would not have been taken anyway.

In another aspect, the CPU 402 can be aware/process about its own status and that of all other components employed therein while operating in a plurality of operating modes. If it is operating in a VMM mode or if it is in a VM/VMx mode, for example, the CPU 402 knows or concurrently processes, in parallel, knowledge of what the pending interrupt is with the highest priority (or winning interrupt) for each VM 412-416 and the VMM 410 together or independently at the same time/concurrently, for example. The CPU 402 (e.g., via the PC 408) can determine that it is in a VM mode, and thus, for example, make the decision that if there is a new interrupt/service request for VM1 414, whether to directly pass it along or generate an ISR to VM1 414, or another VM (e.g., VM2 416) that is under execution without having to switch to VMM mode where otherwise the VMM 410 could provide a VMM call to the VM1 414 under execution.

In VMM mode of operation, the VMM 410 controls/manages interrupts to the VMs 412-416 and their individual priority states with information from each of the ICRs 424, 428, and 432, and its own ICR 420, which can each comprise a CCPN, PIPN and IE as components with data similar to the ICR.CCPN 312, the ICR.PIPN 314, and the ICR.IE 316 respectively of the CPU 310, and also with PCXIs 422-434 as a similar component with similar data as PCXI 308 described above. VMM mode could also be referred to as hypervisor mode (or similar mode as an additional priority mode) in which the virtual machine monitor is the only component executing/running if a hypervisor port is enabled in the CPU 402; then the VMM 410 can be the only one running in that hypervisor priority for determining whether a VM can interrupt another VM, or be interrupted by another application/component of the device 100 or CPU 402, for example.

Figure 5:
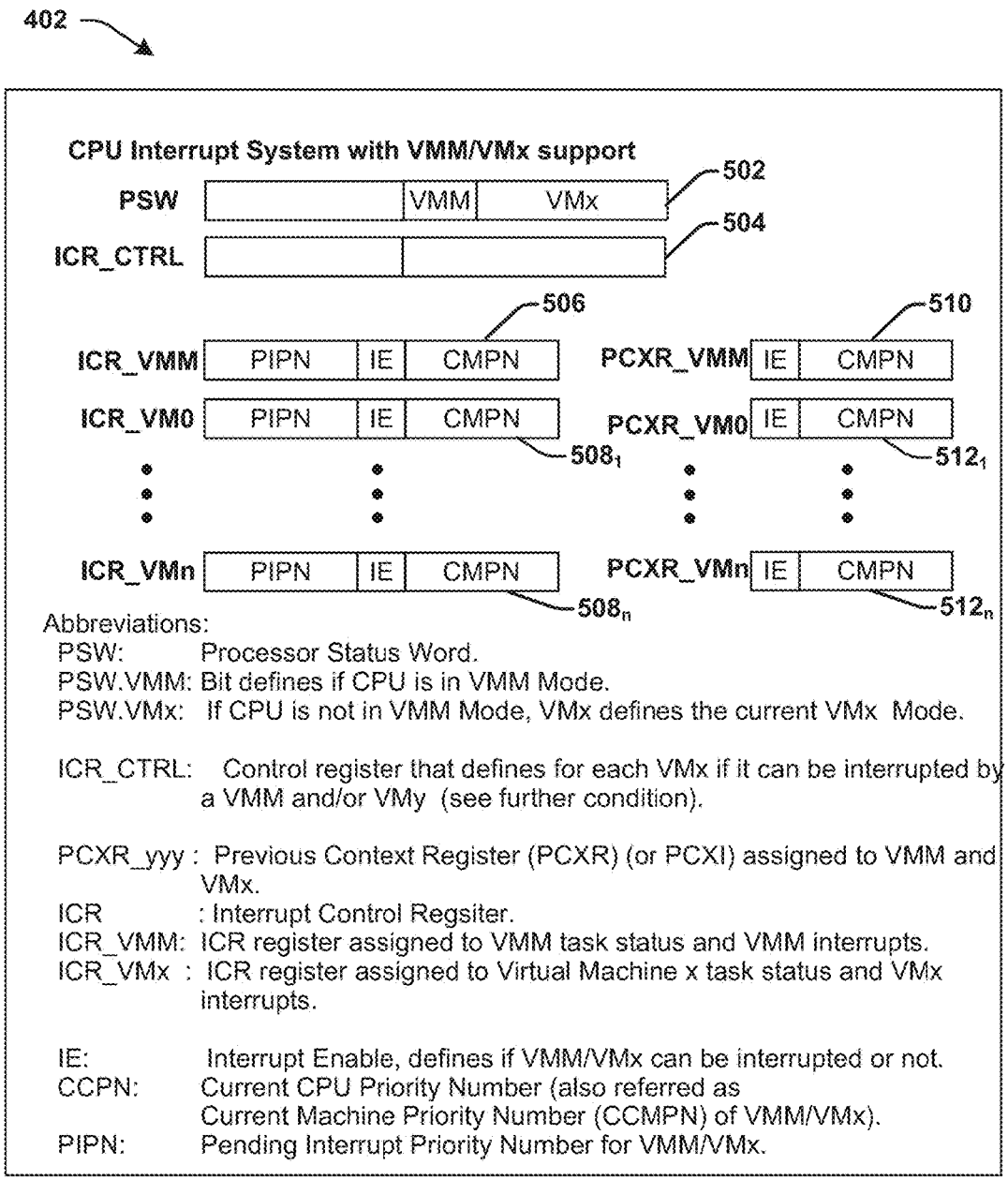
FIG. 5 is another block diagram of the CPU with extended component data for interrupts with hypervisor/VMM support according to various aspects or embodiments described herein.
Figure 6:
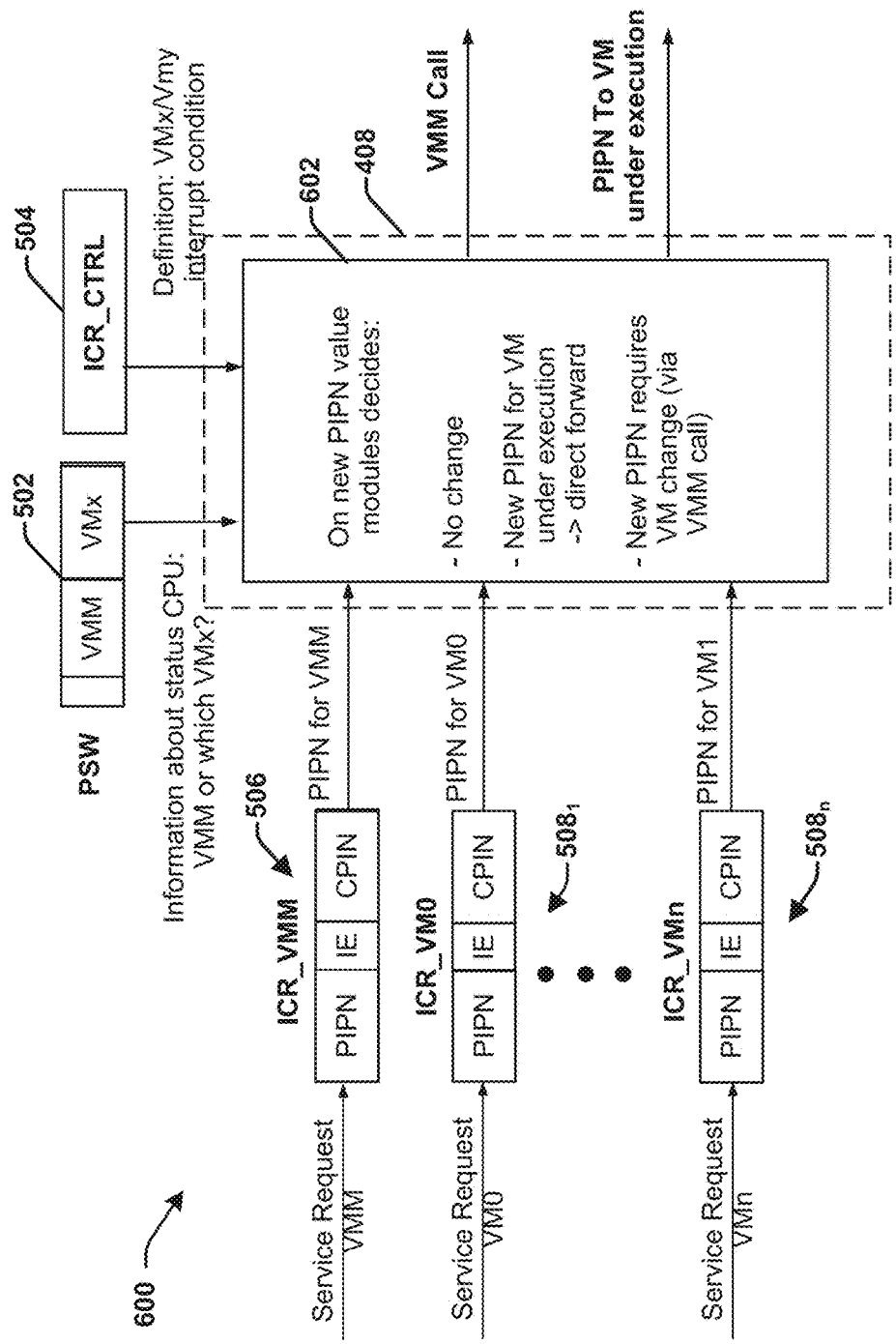
FIG. 6 is another block diagram of CPU inputs and outputs of CPU components for interrupts with hypervisor/VMM support according to various aspects or embodiments described herein.

Referring to FIGS. 5 and 6 together, illustrated in FIG. 5 is an example of data in a CPU interface to an interrupt system as described in conjunction with FIG. 6. While FIG. 5 illustrates the CPU 402 with certain data or inputs for controlling decisions (e.g., an extended PSW (ePSW), or a dedicated ISR/PCXR (PCXI)), upon which decisions are based, FIG. 6 illustrates the data being inputted into a decision logic component 602 of the processor component 408.

In one example, a bus interface (e.g., 140 or 450) as described in reference to FIGS. 1 and 4 as well could serve as one example context by which the CPU 402, for example, could interface with the various components associated with or controlled by the CPU 402. As such, this information or data of an interface for making decisions via the processor component 408 with a decision logic component 602 can be processed over one or more inputs to determine how to control, or delegate control of, to the VMM 410/VMMs 412-416.

The CPU 402 illustrated in FIG. 5 is illustrated with various types of received data that can be processed for arbitration decisions related to a newly received interrupt, either directly in the VM mode or via a VMM call in the VMM mode of operation, for example. The CPU interface to the interrupt system can operate to control one or more VMs (e.g., 412-416) for a task of an application on an instance of a guest operating system. The CPU 402, for example, can have one or multiple interfaces (e.g., ports/inputs/output terminals, or the like) to the interrupt system where the decision component 602 can receive information about the latest winning service request for one or more VMs and the VMM. As such, the VMM 410 and each VM 412-416 can store or access a different priority scheme, which can vary based on the different inputs and data illustrated by each data field related to the ICR and the previous context register (PCXR, or as PCXI), different priority thresholds, or the like, in which each priority scheme/threshold can be based on one or more independent factors related to interrupt queue time, interrupt queue application origin, current status, task association, other resource availability, or other priority scheme factors, for example.

In one aspect/embodiment, the input data could be dedicated per VM 410/VMM 412-416, or the interrupt/service request information (as a service request for resources or an interruption of current processes for a resource) could be signaled by being time multiplexed by the interrupt system 500 to the CPU 402, or the interrupt/service request information could be a mix of dedicated interfaces (e.g. for the VMM service request information) and time multiplexed (e.g. for the service request information for the VMs 412-416). A time multiplex solution can offer a slightly higher interrupt latency, for example, compared to a mix of dedicated interfaces that can generate less clock cycles potentially with the VMM interrupt structure/component support for the CPU 402 than without it.

In another aspect, a PSW data 502 can be controlled by the PSW 404 component of CPU 402 and be an extended/ extension of the PSW (ePSW) 502. The CPU PSW 404 can provide register bit information 502 about the VMM/VMx status of the CPU 402. This means that the CPU 402 hardware (processor component 408) can always be aware as to currently whether the VMM 410, or any one of the VMs 412-416 is under execution, including the information of which VM is under execution, VM0 412, VM1 414, or VM2 416, especially at the time of receiving a new interrupt/service request.

The ePSW 502 can comprise a PSW.VMM bit(s)/indication and a PSW.VM bit(s)/indication field, as well as other container information or data. The PSW.VM bit field can include an indication of a number of adjacent computer memory locations which have been allocated to hold a sequence of bits or like data structure corresponding to the ePSW 502, for example. A modification of the PSW.VMM and the PSW.VM information can be restricted to the VMM 410, for example. This means that a software or application can change it only if the VMM bit is set (or true), where the CPU 402 is operating in the VMM mode and the software/application under execution has VMM privileges. As stated above, the VMM mode determines that the VMM 410 can manage the VMs 412-416 via a VMM call to a VM for an ISR in response to an application or other VM making an interrupt/service request for another VM, rather than the CPU 402 or the processor component 408 of the CPU 402 directly managing/controlling the decisions and implementation of an ISR in response to the a received interrupt/service request. A software can have VMM privileges where it is able to access or communicate to the VMM 410 and make a request for resources (or another VM), for example, or a software of the VMM 410 is operable as described to control VMs 412-416 according to the VMM mode of operation.

Other data or related inputs can be transmitted by the ICR_CTRL (or ICR.CTRL) 504 for a dedicated ICR per VMx 412-416, VMM 410, for example, and include variables of the decision operations or schemes. The CPU 504 can thus implement/control multiple instances of the ICRs 420, 424, 428, and 432 via the ICR.CTRL 406, in which each instances of transmitted data can be data inputs 506 and 508$_1$-508$_n$ to the CPU 402.

For example, one instance dedicated for the VMM 410 can be ICR_VMM 506 as a data input that can comprise a bit field, a current machine (VMM/VMx) priority number (CMPN), and an interrupt enable (IE). The ICR_VMM.PIPN bit(s)/indication field provides the pending interrupt priority number for the VMM 410. The ICR_VMM.CMPN comprises the priority of the current VMM task that is under execution or being serviced. Additionally, the ICR_VMM.IE signals whether the VMM task under execution can be interrupted or not.

The ICR_VMM register 506 can be assigned to the PSW.VMM bit of the PSW 502. Thus, the PSW.VMM bit(s)/indication field can control, manage or communicate data with the ICR_VMM register 506 of the VMM 410. The PSW defines the CPU hardware status (as to whether it is in VMM mode, and if not, what VMx it is operating in for VM mode) for each hardware status (VMM, VM0, Vm1, . . . etc.). There can be one ICR register fix assigned to it. This includes access protection for ICR modification, where if the CPU is in VMM mode, software can modify all ICR registers, and if the CPU is in VM1 mode, for example, the software can modify only ICR_VM1, but not ICR_VMM, ICR_VM0, and so on to ICR_VMx/ICR_VMn (wherein x or n can be used to represent an positive integer greater than zero, for example).

Another data instance can be dedicated for each supported VM 412-416 as ICR_VMx; 508x=0-n or 508$_1$-508$_n$. The ICR_VMx.PIPN bit field 508$_1$-508$_n$ indicates the pending interrupt priority number for the VMx (e.g., VMx 412-416). The ICR_VMx.CMPN 508$_1$-508$_n$ indicates the priority of the current VMx 412-416 task that is under execution or in a busy state. The ICR_VMx.IE 508$_1$-508$_n$ signals whether the the VMx task under execution can be interrupted or not. Each ICR_VMx register 508$_1$-508$_n$ can be assigned/controlled by hardware to one PSW.VM bit encoding, respectively, and can be controlled by software if the PSW.VMx is set to the related encoding or if the PSW.VMM is set.

The dedicated previous context information registers (PCXI) can be configured per VMx 512$_1$-512$_n$, and the VMM 410, as also referred to as a previous context Register (PCXR). The PCXI registers 422, 426, 430, and 434, for example, includes information about the previous/interrupted task of the VMx 412-416/VMM 410, respectively. For example, this information related to the PCXI/PCXR 510, 512$_1$-512$_n$ can comprise previous interrupt enable (IE) bit(s), previous machine priority number(s), and additional information or pointers. The previous interrupt IE bits can provide the state or status of the previous/interrupted task of the associated machine being interrupted by the interrupt. The previous machine priority number can refer to the level of the previous/interrupted task of this machine. The additional information can include a pointer or other indicator to the tasks Context Save Area, type of Context Save operation, or other memory related fetch or instruction recall that was being executed or interrupted, for example.

The CPU 402 can implement multiple instances of the PCXI for the various machines also. One instance can be dedicated for the VMM (PCXI_VMM/PCXR_VMM) 510. The PCXI_VMM register 422 can be assigned to the PSW.VMM bits 510, and another instance can be dedicated for each supported Virtual Machine (PCXI_VMx, x=0-n) 512$_1$-512$_n$. Each PCXI_VMx register 426, 430, and 434 can be assigned by the CPU 402 to PSW.VM bit(s) encoding.

Each VMx instance can be assigned by hardware to one PSW.VMx encoding. If the CPU is in VMM mode, which can mean that the PSW.VMM bit 502 is set (or true), then the following can occur: 1) an application/sofware can modify the ICR_VMM/VMx 420, 424, 428, and 432, and also the PCXI_VMM/VMx 422, 426, 430, and 434 components/registers; 2) hardware/CPU will consider for RFI instruction as PCXI_VMM 510 setting; 3) an exception (interrupt) or return from an exception/interrupt can modify PCXI_VMM 510.

If the CPU 402 is in VMx mode, which can means that the PSW.VMM bit(s) of PSW 502 is not set, then the PSW.VM is set to the VMx encoding, and the following can occur: 1) hardware/CPU can consider for RFI instruction PCXI_VMx setting 512$_1$-512$_n$; 2) an application/software can modify only the VMx_ICR component/register 512$_1$-512$_n$; an exception (interrupt) or return from exception will modify/trigger modification of the PCXI_VMx 512$_1$-512$_n$.

In an aspect, the dedicated ICR configuration control register (ICR_CTRL) 406 can be utilized to always keep the CPU hardware aware about the status of the VMM 410 or which VMx (via or by the PSW.VMM and PSW.VM). The ICR_CTRL component can only be modified by application software while the CPU 402 is in VMM mode. In addition, the CPU 402 or other component could lock the ICR_CTRL 406 during runtime.

The CPU 402 provides an additional configuration register (ICR_CTRL) 406 where application software can define how the CPU re-acts to new PIPN values in the ICR_VMx/ICR_VMM 506, 508$_1$-508$_n$ registers while a VMx is under execution. The additional register can include comprising an ICR_CTRL that comprises or indicates the various responses to various interrupt conditions related to the VMM/hypervisor and the plurality of VMs, coupled to the decision logic component 602. The decision logic component 602 can thus can then decide to response to a new PIPN value by: implementing no change, utilize the new PIPN for the VM under execution or busy, then direct forward to the PIPN under execution if in VM mode, or utilize the new PIPN and if requiring a VM change send to the VM with a VMM call via the VMM 410, for example.

Various responses or reactions and under what conditions thus can be figured as described in a few examples. In one example, when a VMx is under execution (defined via PSW.VM or PSW_VMx), a new Interrupt for the VMM 410 is signaled by the interrupt system to the CPU 402, the ICR_VMx.IE is set (or true), the threshold ICR_VMM.PIPN>ICR_VMx.PIPN is true, and if it is configured that the VMx can be interrupted by VMM interrupts, then the CPU 402 hardware changes into the VMM mode, otherwise the VMx is not interrupted.

In another example, when the VMx is under execution, a new Interrupt for VMy (a different VM from VMx, for example) is signaled by an interrupt/the interrupt system to the CPU 402, the ICR_VMx.IE is set (or true), a threshold is satisfied such as ICR_VMy.PIPN>ICR_VMx.PIPN AND ICR_VMy.PIPN>ICR_VMy.CMPN (e.g., the first VM PIPN being greater than another first VM PIPN and a second VM PIPN being greater than another second VM PIPN), it is configured that VMx can be interrupted by a VMy interrupt, and the first VM being configured to be interrupted by the interrupt, then another response can include changing to a VMM/hypervisor mode of operation to interrupt the first VM via the VMM/hypervisor, otherwise the VMx is not interrupted.

In a further example, if the VMx is under execution a new Interrupt for the VMx is signaled by interrupt/the interrupt system to the CPU 402, the ICR_VMx.IE is set (or true), the threshold ICR_VMx.PIPN>ICR_VMx.PIPN is satisfied, then it can be configured if the CPU changes into VMM state or stays in VMx mode and interrupts the current task.

In other embodiments, the CPU 402 can introduce one general register or one register per VMx that defines: an interrupt priority level where a VMx can be interrupted if VMx ICR_VMx.IE bit is set, there is at least one VMy with ICR_VMy.PIPN>ICR_VMx.PIPN, and the VMx is enabled to be interrupted by another VM. The advantage of this option is that a VMx task can be interrupted by any interrupt mapped to the VMx with a ICR_VMx.PIPN>ICR_VMx.CCPN, and an independent priority level/threshold to interrupt the VMx by another VMy can be performed. The advantage is that for each VM one level is defined by the application software executed by the VM (via CMPN) and a second level can be defined for this VM by the VMM where another VM with a higher priority service request can interrupt the VMx.

The decision logic component 602 can thus operate to take into account the different states as current and previous as well as the priority numbering of each virtual component of the CPU 402 for an interrupt call and arbitrate the resources, whether a given VM is running or not, similar to a state function, for example. As such, a first stage of the decision logic component 602 can include a local arbitration of VMs to find the highest interrupt for each VM, and then a second stage can take into account all the requests from the different VMs which one is the currently active, and then based on this data decide whether to forward to the current VM or interrupt another one.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 7:
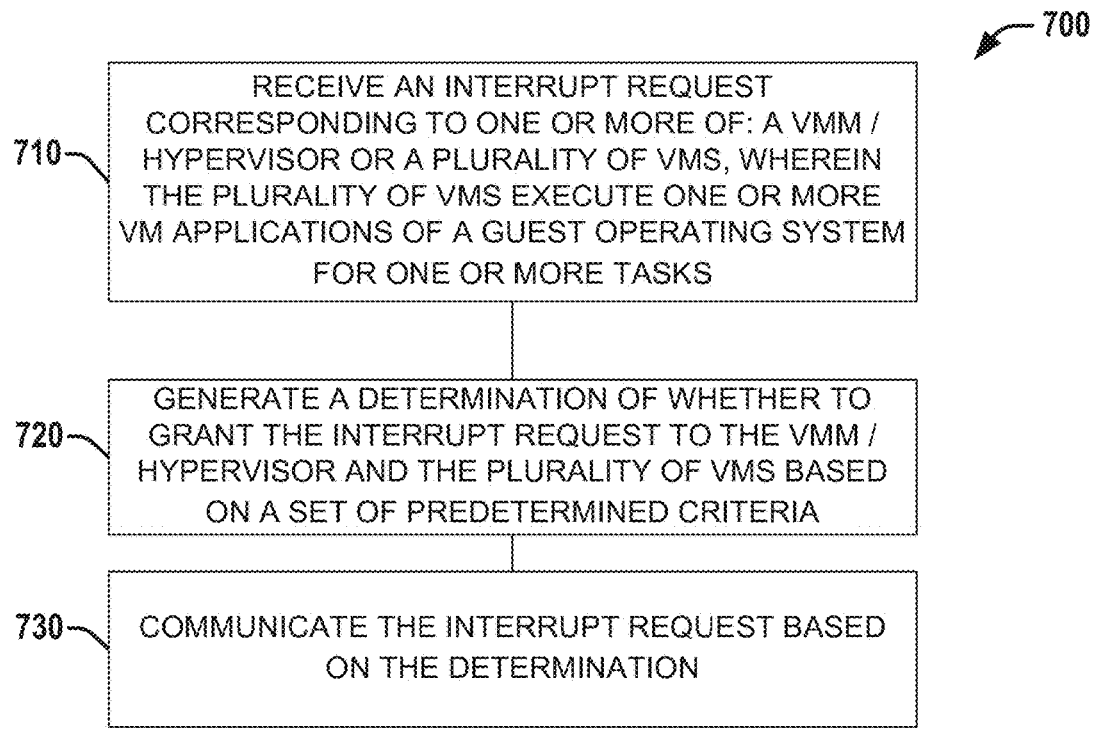
FIG. 7 is an example process flow for supporting interrupts within a CPU with a hypervisor according to various aspects or embodiments described herein.

Referring to FIG. 7, is a process flow 700 for controlling interrupt service requests of a hypervisor/VMM and VMs for a CPU. The method initiates at 710 with receiving, via one or more processors, an interrupt request corresponding to one or more of: a VMM/hypervisor or a plurality of VMs, which can be configured to execute one or more VM applications of a guest operating system for one or more tasks.

At 720, a determination can be generated of whether to grant the interrupt request to the VMM/hypervisor and the plurality of VMs based on a set of predetermined criteria.

At 730, the interrupt request can be communicated based on the determination, or an ISR can be generated.

In other aspects, a determination can also be made of a current status of interrupt priority schemes corresponding to the VMM/hypervisor and the plurality of VMs based on information from a CPU ICUs and a PCXIs registers, respectively corresponding to the VMM/hypervisor and the VMs.

The operations of the process flow 700 can further include directly forwarding, via the bus, the interrupt to a VM while the VM is concurrently under execution without a VMM call from the VMM/hypervisor in response to the CPU being in a VM mode instead of a VMM/hypervisor mode.

A determination can also be made as to whether a first VM is configured to be interrupted by a service request received as the interrupt from a second VM of the plurality of VMs based on conditions (or defined responses/thresholds) that can be configured by the VMM/hypervisor. These conditions or reactions can include priority thresholds comprising: a pending interrupt number associated with the VMM/hypervisor and the plurality of VMs respectively, a current central processing unit (CPU) priority number associated with the VMM/hypervisor and the plurality of VMs respectively, and one or more additional priority thresholds for determining whether a first VM is able to be interrupted directly by an interrupt mapped to a second VM in response to the processor component operating in a VM mode.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a system, comprising: a processor component comprising a plurality of virtual machines (VMs) and a virtual machine monitor (VMM)/hypervisor configured to control the plurality of VMs, wherein the processor is configured to: receive a plurality of interrupt requests corresponding to one or more of: the VMM/hypervisor or the plurality of VMs; and determine whether to grant an interrupt request of the plurality of interrupt requests to the VMM/hypervisor and the plurality of VMs based on a set of predetermined criteria.

Example 2 includes the subject matter of Example 1, wherein the VMM/hypervisor and the plurality of virtual machines (VMs) respectively comprise a interrupt control register (ICR) and a previous context and execution information (PCXI) register, and the processor component is further configured to determine a current status of interrupt priority schemes corresponding respectively to the VMM/hypervisor and the plurality of VMs as part of the set of predetermined criteria.

Example 3 includes the subject matter of any one of Examples 1-2, including or omitting any optional elements, wherein the set of predetermined criteria comprises one or more of: a current task priority, a pending interrupt priority, or an interrupt enable, associated with the current status.

Example 4 includes the subject matter of any one of Examples 1-3, including or omitting any optional elements, wherein the processor component further comprises a processor status register, comprising an extended processor status word (ePSW), and an additional register comprising an interrupt control register (ICR) configuration control (ICR CTRL) that comprises a plurality of responses to various interrupt conditions related to the VMM/hypervisor and the plurality of VMs.

Example 5 includes the subject matter of any one of Examples 1-4, including or omitting any optional elements, wherein the plurality of interrupt requests comprises a plurality of VM service requests corresponding to the one or more VM applications.

Example 6 includes the subject matter of any one of Examples 1-5, including or omitting any optional elements, wherein the processor component is further configured to directly forward one or more interrupt requests of the plurality of interrupt requests to a VM of the plurality of VMs while the VM is concurrently under execution, and wherein the VM is further configured to receive the one or more interrupt requests without a VMM call from the VMM/hypervisor.

Example 7 includes the subject matter of any one of Examples 1-6, including or omitting any optional elements, wherein the processor component further comprises a decision logic component configured to determine whether a first VM of the plurality of VMs is configured to be interrupted by a service request received from a second VM of the plurality of VMs based on one or more conditions configured by the VMM/hypervisor.

Example 8 includes the subject matter of any one of Examples 1-7, including or omitting any optional elements, wherein the VMM/hypervisor is further configured to define the one or more conditions for the decision logic component, wherein the one or more conditions comprise priority thresholds comprising: a pending interrupt number associated with the VMM/hypervisor and the plurality of VMs respectively, a current central processing unit (CPU) priority number associated with the VMM/hypervisor and the plurality of VMs respectively, and one or more additional priority thresholds for determining whether a first VM is able to be interrupted directly by an interrupt mapped to a second VM in response to the processor component operating in a VM mode.

Example 9 is an apparatus, comprising: a processor component comprising a memory that includes instructions to execute operations, a plurality of interfaces and a bus configured to communicatively couple the memory and the plurality of interfaces to a plurality of virtual machines (VMs) and a virtual machine monitor (VMM)/hypervisor and communicate data related to a plurality of interrupt requests of the plurality of VMs and the VMM/hypervisor to a decision logic component of the processor component; wherein the processor component is configured to determine whether to grant an interrupt request of the plurality of interrupt requests to or from the VMM/hypervisor and the plurality of VMs based on a set of predetermined criteria.

Example 10 includes the subject matter of Example 9, including or omitting any optional elements, wherein the set of predetermined criteria comprises a mode of operation of the processor component from a set of modes comprising a VM mode and a VMM/hypervisor mode, and wherein the processor component is further configured to directly grant the interrupt request and trigger an interrupt service routine (ISR) at a VM of the plurality of VMs in response to being in the VM mode.

Example 11 includes the subject matter of any one of Examples 9-10, including or omitting any optional elements, wherein the plurality of interrupt requests comprises a plurality of winning service requests that result from different interrupt priority schemes of the VMM and the plurality of VMs, and wherein the processor component is further configured to trigger an ISR at a VM of the plurality of VMs in response to the interrupt request as a winning service request based on first priority levels of applications being executed by the plurality of VMs and second priority levels of the plurality of VMs defined by the VMM/hypervisor.

Example 12 includes the subject matter of any one of Examples 9-11, including or omitting any optional elements further comprising: a processor status register, comprising an extended processor status word (ePSW), coupled to the decision logic component, and configured to provide the ePSW to the decision logic component; and an additional register, comprising an interrupt control register (ICR) configuration control (ICR CTRL) that comprises a plurality of responses to various interrupt conditions related to the VMM/hypervisor and the plurality of VMs, coupled to the decision logic component, and configured to provide the ICR CTRL to the decision logic component.

Example 13 includes the subject matter of any one of Examples 9-12, including or omitting any optional elements wherein the ePSW indicates whether the VMM/hypervisor and one or more VMs of the plurality of VMs is in a busy state, and identifies the one or more VMs in the busy state.

Example 14 includes the subject matter of any one of Examples 9-13, wherein the decision logic is configured to determine whether a first VMx of the plurality of VMs is configured to be interrupted by a service request received from a second VMy of the plurality of VMs based on the various interrupt conditions, and determine the responses to the various conditions based on a comparison with priority thresholds.

Example 15 includes the subject matter of any one of Examples 9-14, including or omitting any optional elements, wherein the priority thresholds comprise: a pending interrupt number associated with the VMM/hypervisor and the plurality of VMs respectively, a current central processing unit (CPU) priority number associated with the VMM/hypervisor and the plurality of VMs respectively, and one or more additional priority thresholds for determining whether a first VM is able to be interrupted directly by an interrupt mapped to a second VM in response to the processor component operating in a VM mode or a VMM/hypervisor mode of operation.

Example 16 is a method comprising: receiving, via one or more processors, an interrupt corresponding to one or more of: a VMM/hypervisor or a plurality of VMs; generating, via the one or more processors, a determination of whether to grant the interrupt to the VMM/hypervisor and the plurality of VMs based on a set of predetermined criteria; and communicating, via a bus communicatively coupled to the one or more processors, the VMM/hypervisor and the plurality of VMs, the interrupt based on the determination.

Example 17 includes the subject matter of Example 16, wherein the operations further comprise: determining a current status of interrupt priority schemes corresponding to the VMM/hypervisor and the plurality of VMs based on information from a central processing unit (CPU) interrupt control registers (ICUs) and a previous context and execution information (PCXIs) registers of the VMM/hypervisor and the plurality of virtual machines (VMs).

Example 18 includes the subject matter of any one of Examples 16-17, including or omitting any optional elements, wherein the operations further comprise: in response to operating in a VM mode instead of a VMM/hypervisor mode, directly forwarding, via the bus, the interrupt to a VM of the plurality of VMs while the VM is concurrently under execution without a VMM call from the VMM/hypervisor.

Example 19 includes the subject matter of any one of Examples 16-18, including or omitting any optional elements, wherein the operations further comprise: determining, via the one or more processors, whether a first VM of the plurality of VMs is configured to be interrupted by a service request received as the interrupt from a second VM of the plurality of VMs based on one or more conditions configured by the VMM/hypervisor.

Example 20 includes the subject matter of any one of Examples 16-19, including or omitting any optional elements, wherein the operations further comprise: defining the one or more conditions including priority thresholds comprising: a pending interrupt number associated with the VMM/hypervisor and the plurality of VMs respectively, a current central processing unit (CPU) priority number associated with the VMM/hypervisor and the plurality of VMs respectively, and one or more additional priority thresholds for determining whether a first VM is able to be interrupted directly by an interrupt mapped to a second VM in response to the processor component operating in a VM mode.

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated mobile or personal computing devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques, such as millimeter wave bands in the range of 30 GHz to 300 GHz, for example.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A system, comprising:
a processor component comprising a plurality of virtual machines (VMs) and a virtual machine monitor (VMM)/hypervisor configured to control the plurality of VMs, wherein the processor component is configured to:
receive a plurality of interrupt requests that correspond to one or more of: the VMM/hypervisor or the plurality of VMs; and
determine whether to grant an interrupt request of the plurality of interrupt requests to the VMM/hypervisor and the plurality of VMs based on a set of predetermined criteria,
wherein the processor component is further configured to determine current statuses of interrupt priority schemes at the VMM/hypervisor and the plurality of VMs as part of the set of predetermined criteria.

2. The system of claim 1, wherein the VMM/hypervisor and the plurality of virtual machines (VMs) respectively comprise a interrupt control register (ICR) and a previous context and execution information (PCXI) register.

3. The system of claim 2, wherein the set of predetermined criteria comprises one or more of: a current task priority, a pending interrupt priority, or an interrupt enable, associated with the current status.

4. The system of claim 1, wherein the processor component further comprises a processor status register, comprising an extended processor status word (ePSW), and an additional register comprising the interrupt control register (ICR) configuration control (ICR CTRL) that comprises a plurality of responses to various interrupt conditions related to the VMM/hypervisor and the plurality of VMs.

5. The system of claim 1, wherein the plurality of interrupt requests comprises a plurality of VM service requests corresponding to one or more VM applications.

6. The system of claim 1, wherein the processor component is further configured to directly forward one or more interrupt requests of the plurality of interrupt requests to a VM of the plurality of VMs while the VM is concurrently under execution, and wherein the VM is further configured to receive the one or more interrupt requests without a VMM call from the VMM/hypervisor.

7. The system of claim 1, wherein the processor component further comprises a decision logic component configured to determine whether a first VM of the plurality of VMs is configured to be interrupted by a service request received from a second VM of the plurality of VMs based on one or more conditions configured by the VMM/hypervisor.

8. The system of claim 7, wherein the VMM/hypervisor is further configured to define the one or more conditions for the decision logic component, wherein the one or more conditions comprise priority thresholds comprising: a pending interrupt number associated with the VMM/hypervisor and the plurality of VMs respectively, a current central processing unit (CPU) priority number associated with the VMM/hypervisor and the plurality of VMs respectively, and one or more additional priority thresholds for determining whether a first VM is able to be interrupted directly by an interrupt mapped to a second VM in response to the processor component operating in a VM mode.

9. An apparatus, comprising:
a processor comprising a memory that includes instructions to execute operations, a plurality of interfaces and a bus, wherein the bus is configured to communicatively couple the memory and the plurality of interfaces to a plurality of virtual machines (VMs) and a virtual machine monitor (VMM)/hypervisor, and to communicate data related to a plurality of interrupt requests among the plurality of VMs and the VMM/hypervisor to a decision logic component;

wherein the processor is configured to determine whether to grant an interrupt request of the plurality of interrupt requests to or from the VMM/hypervisor and the plurality of VMs based on a set of predetermined criteria, and wherein the plurality of interrupt requests comprises a plurality of winning service requests that result from different interrupt priority schemes at the VMM and the plurality of VMs.

10. The apparatus of claim 9, wherein the set of predetermined criteria comprises a mode of operation of the processor from a set of modes comprising a VM mode and a VMM/hypervisor mode, and wherein the processor is further configured to directly grant the interrupt request and trigger an interrupt service routine (ISR) at a VM of the plurality of VMs in response to being in the VM mode.

11. The apparatus of claim 9, wherein the processor is further configured to trigger an ISR at a VM of the plurality of VMs in response to the interrupt request as a winning service request based on first priority levels of applications being executed by the plurality of VMs and second priority levels of the plurality of VMs defined by the VMM/hypervisor.

12. The apparatus of claim 9, further comprising:
a processor status register, comprising an extended processor status word (ePSW), coupled to the decision logic component, and configured to provide the ePSW to the decision logic component; and
an additional register, comprising an interrupt control register (ICR) configuration control (ICR CTRL) that comprises a plurality of responses to various interrupt conditions related to the VMM/hypervisor and the plurality of VMs, coupled to the decision logic component, and configured to provide the ICR CTRL to the decision logic component.

13. The apparatus of claim 12, wherein the ePSW indicates whether the VMM/hypervisor and one or more VMs of the plurality of VMs is in a busy state, and identifies the one or more VMs in the busy state.

14. The apparatus of claim 12, wherein the decision logic component is configured to determine whether a first VMx of the plurality of VMs is configured to be interrupted by a service request received from a second VMy of the plurality of VMs based on the various interrupt conditions, and determine the responses to the various conditions based on a comparison with priority thresholds.

15. The apparatus of claim 14, wherein the priority thresholds comprise: a pending interrupt number associated with the VMM/hypervisor and the plurality of VMs respectively, a current central processing unit (CPU) priority number associated with the VMM/hypervisor and the plurality of VMs respectively, and one or more additional priority thresholds for determining whether a first VM is able to be interrupted directly by an interrupt mapped to a second VM in response to the processor operating in a VM mode or a VMM/hypervisor mode of operation.

16. A method comprising:
receiving, via one or more processors, an interrupt the corresponds to at least one of: a VMM/hypervisor or a plurality of VMs;
generating, via the one or more processors, a determination of whether to grant the interrupt to the VMM/hypervisor and the plurality of VMs based on a set of predetermined criteria;
determining current results of a plurality of interrupt priority schemes performed at the VMM/hypervisor and the plurality of VMs based on information from a central processing unit (CPU) interrupt control registers (ICRs) and previous context and execution information (PCXIs) registers at the VMM/hypervisor and the plurality of virtual machines (VMs); and
communicating, via a bus communicatively coupled to the one or more processors, the VMM/hypervisor and the plurality of VMs, the interrupt based on the determination.

17. The method of claim 16, wherein the operations further comprise:
in response to operating in a VM mode instead of a VMM/hypervisor mode, directly forwarding, via the bus, the interrupt to a VM of the plurality of VMs while the VM is concurrently under execution without a VMM call from the VMM/hypervisor.

18. The method of claim 16, wherein the operations further comprise:
determining, via the one or more processors, whether a first VM of the plurality of VMs is configured to be interrupted by a service request received as the interrupt from a second VM of the plurality of VMs based on one or more conditions configured by the VMM/hypervisor.

19. The method of claim 18, wherein the operations further comprise:
defining the one or more conditions including priority thresholds comprising: a pending interrupt number associated with the VMM/hypervisor and the plurality of VMs respectively, a current central processing unit (CPU) priority number associated with the VMM/hypervisor and the plurality of VMs respectively, and one or more additional priority thresholds for determining whether a first VM is able to be interrupted directly by an interrupt mapped to a second VM in response to the one or more processors operating in a VM mode.

* * * * *